United States Patent [19]

Yanagawa

[11] Patent Number: 5,168,486
[45] Date of Patent: Dec. 1, 1992

[54] RECORDING DEVICE FOR RECORDING A BLANK DISK FROM AN OPTICAL DISK

[75] Inventor: Naoharu Yanagawa, Saitama, Japan

[73] Assignee: Pioneer Electronic Corporation, Tokyo, Japan

[21] Appl. No.: 624,937

[22] Filed: Dec. 10, 1990

[30] Foreign Application Priority Data

Jun. 15, 1990 [JP] Japan .................................. 2-156930

[51] Int. Cl.[5] ........................... G11B 7/00; G11B 7/08
[52] U.S. Cl. ................................ 369/44.14; 369/44.39
[58] Field of Search ...................... 369/44.14, 112, 110, 369/44.11, 44.15, 44.17, 32, 119, 44.39, 109, 111, 84; 360/15, 77.03, 77.05, 77.08

[56] References Cited

U.S. PATENT DOCUMENTS

| 4,387,452 | 6/1983 | Bricot et al. | 369/44.14 |
| 4,507,773 | 3/1985 | McCann et al. | 369/110 |
| 4,797,866 | 1/1989 | Yoshikawa | 369/110 |

FOREIGN PATENT DOCUMENTS

| 0137142 | 8/1983 | Japan | 369/44.14 |
| 0088144 | 4/1987 | Japan | 369/44.14 |
| 0113839 | 5/1988 | Japan | 369/44.14 |
| 0007326 | 1/1989 | Japan | 369/44.11 |
| 0014733 | 1/1989 | Japan | 369/44.14 |

Primary Examiner—Roy N. Envall, Jr.
Assistant Examiner—Thang V. Tran
Attorney, Agent, or Firm—Nikaido, Marmelstein, Murray & Oram

[57] ABSTRACT

An original disk having recording control data on a recording surface thereof and a blank disk having an unrecorded surface are coaxially disposed, and provided to be rotated by a spindle motor in opposite directions. A reproducing pickup for reading the recording control data on the original disk, and a recording pickup for recording data on the blank disk in accordance with the read out control data are coaxially provided. Both pickups are moved in a radial direction of the disk together in accordance with read out control data. Each pickup is independently moved in the axial direction for the focusing thereof.

3 Claims, 6 Drawing Sheets

FIG. 1
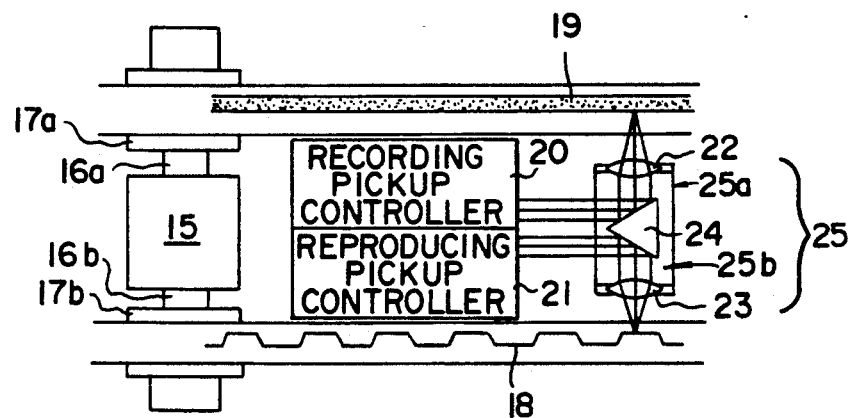
FIG. 2a
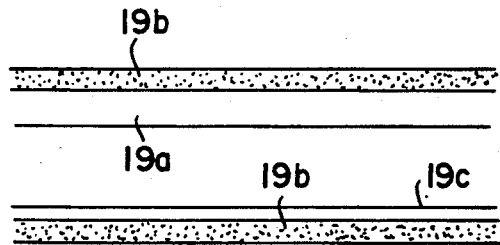
FIG. 2b
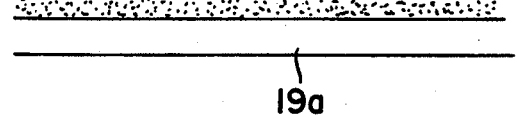
FIG. 2c

RECORDING DEVICE FOR RECORDING A BLANK DISK FROM AN OPTICAL DISK

BACKGROUND OF THE INVENTION

The present invention relates to a device for recording data in an optical disk.

As an optical disk having a high recording density, a CD and a video disk are known.

In mass production of the disk, a large number of disks are manufactured by molding from an original disk. However, in order to record data on a small number of disks, it is disadvantageous to provide such a large scale installation.

To manufacture a small number of disks, it has been proposed to record data on a blank disk. However, in order to move a recording head in the radial direction, it is necessary to provide a tracking servo system having an extremely high accuracy.

On the other hand, there is provided an erasable disk for enabling individual recording.

FIG. 9 shows a part of an erasable disk. The erasable disk has an acrylic base plate 7 on which a pre-coating layer 8, a transferring layer 9 and a coloring matter layer 10 are provided. For guiding the recording of data, a plurality of guide grooves 11 and address pits 12 are formed on a recording surface of the coloring matter layer 10. The guide grooves 11 are spirally provided from the center of the disk.

A tracking pitch T of the guide groove 11 is about 1.8 $\mu$m, width TP of the groove is 0.45 $\mu$m, and depth TQ thereof is 0.1 $\mu$m.

However, it is costly to manufacture the erasable disk having such a precise guiding means.

SUMMARY OF THE INVENTION

The object of the present invention is to provide a recording device which may manufacture an optical disk at a low cost.

According to the present invention, there is provided a recording device for an optical disk, comprising a spindle motor, an original disk having tracking control data and spindle motor control data on a recording surface thereof and provided to be rotated by the spindle motor, a blank disk having an unrecorded surface which is coaxially disposed with the original disk opposite the recording surface of the original disk, and provided to be rotated by the spindle motor at the same speed as the original disk, a reproducing pickup for reading the tracking control data and spindle motor control data on the original disk, and a recording pickup for recording data on the blank disk in accordance with the read out control data.

The reproducing pickup is driven in the radial direction of the disk together with the recording pickup in accordance with read out tracking control data. The reproducing pickup and the recording pickup are independently driven in the axial direction for the focusing thereof.

In an aspect of the invention, the blank disk and the original disk are produced by rotating in opposite directions to each other, and the reproducing pickup and the recording pickup are coaxially disposed with each other.

BRIEF DESCRIPTION OF THE DRAWINGS

FIG. 1 is a schematic diagram showing a recording device for an optical disk according to the present invention;

FIGS. 2a to 2c are explanatory views showing a process for manufacturing a blank optical disk;

DETAILED DESCRIPTION OF THE PREFERRED EMBODIMENTS

Figure 3:
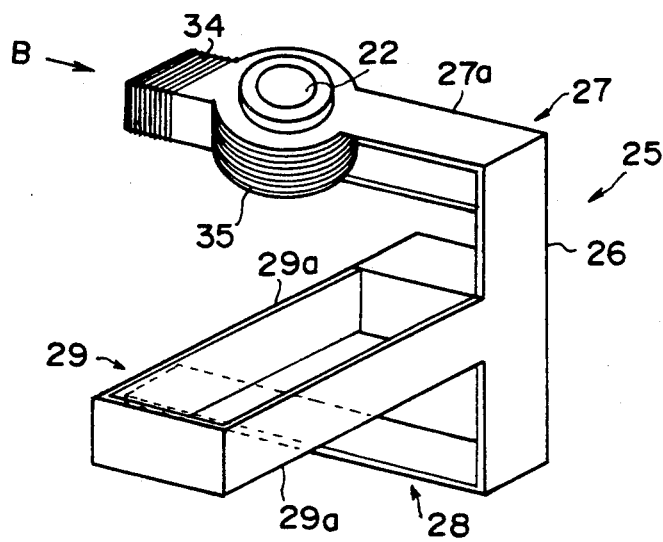
FIG. 3 is a perspective view showing a pickup of the recording device.

Referring to FIG. 1, a recording device of the present invention has a spindle motor 15, a pair of spindles 16a and 16b connected to the motor 15, and a pair of turntables 17a and 17b securely mounted on the spindles 16a and 16b, respectively. The spindles 16a and 16b are adapted to be rotated in the opposite directions to each other by the motor 15. On the turntable 17b, an optical disk 18 having a plurality of guide grooves representing tracking control data and spindle motor control data is clamped as an original disk. A blank disk 19 is clamped on the turntable 17a.

Referring to FIGS. 2a to 2c showing the manufacturing process of the blank disk 19, a glass disk 19a is grinded and cleaned (FIG. 2a). A recording film 19b is coated on the disk 19a (FIG. 2b), and a protecting film 19c is formed on the film 19b thereafter (FIG. 2c).

The guiding disk 18 is formed with grooves for control data such as synchronizing signal and address.

The recording device is further provided with a recording pickup controller 20, a reproducing pickup controller 21, and a pickup 25 which are provided between the disks 18 and 19. The pickup 25 comprises a reproducing pickup 25a and a recording pickup 25b, each having an objective 22 (23). The reproducing pickup 25a and the recording pickup 25b are coaxially disposed with each other. A reflecting mirror 24 is provided between the objectives 22 and 23.

Figure 4:
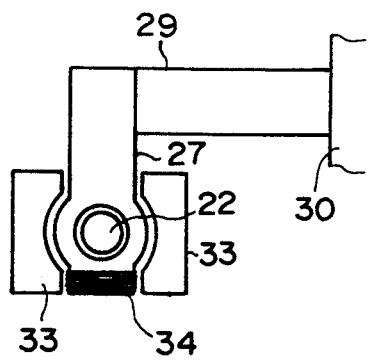
FIG. 4 is a plan view of the pickup of FIG. 3.
Figure 5:
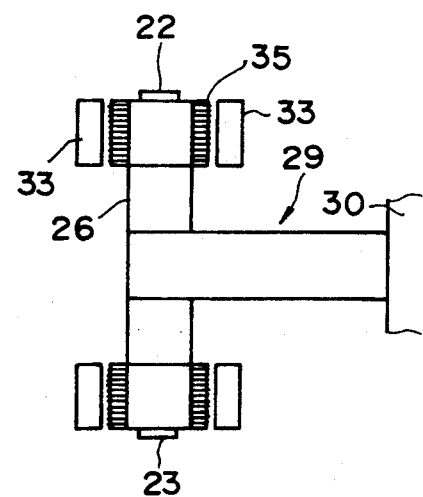
FIG. 5 is a side view of the pickup as viewed from the arrow B of FIG. 3.

Referring to FIGS. 3 to 5, the pickup 25 comprises a tracking spring 29 comprising a pair of spring plates 29a for tracking, a connecting member 26 secured to an end of tracking spring 29, a pair of focus springs 27 and 28 each comprising a pair of spring plates 27a secured to the connecting member 26. The tracking spring 29 is fixed to a supporting member 30. The objectives 22 and 23 are mounted on the focus springs 27 and 28, respectively. A focusing coil 35 is mounted on each of the focus springs 27 and 28, and a tracking coil 34 is secured to the end of each focus spring. Adjacent each coil assembly, a pair of magnets 33 are provided. Thus, the objectives 22 and 23 are independently moved in the focus direction and integrally moved in the tracking direction (radial direction) by energizing the coils 34 and 35.

In operation, when the spindle motor 15 is driven, the spindles 16a and 16b are rotated in opposite directions so that the disk 18 and the blank disk 19 are also rotated in the opposite directions because the recording surfaces of both disks are opposed to each other.

The reproducing pickup controller 21 is operated to produce a laser beam. The laser beam is reflected by the reflecting mirror 24 and the reflected beam is fed to the objective 23. The laser beam is focused on a recording surface of the disk 18 through the objective 23. Thus, the synchronizing signal and the address recorded on the disk 18 are read. The beam reflected from the surface of the disk 18 is returned in the reverse to the reproducing pickup controller 21.

The recording pickup controller 20 is driven to produce a laser beam in accordance with the data applied from the reproducing pickup controller 21. The laser beam is reflected by the mirror 24 and focused on a recording surface of the blank disk 19 through the objective 22.

Furthermore, the reproducing pickup controller 21 produces a tracking servo signal which is applied to a tracking servo system (not shown), so that the pickup 25 is moved in the radial direction. When the tracking coil 34 is energized, the pickup 25 is finely moved in the radial direction, bending the tracking spring 29. When the focus coil 35 is energized, each of the objectives 22 and 23 is independently moved to focus the laser beam. Thus, the synchronizing signal and the address of the disk 18 are recorded on the disk 19. Data to be recorded such as a signal read out from an image scanner (not shown) and digital data from an external computer which are modulated in a modulator are recorded on the disk 19.

Figure 6:
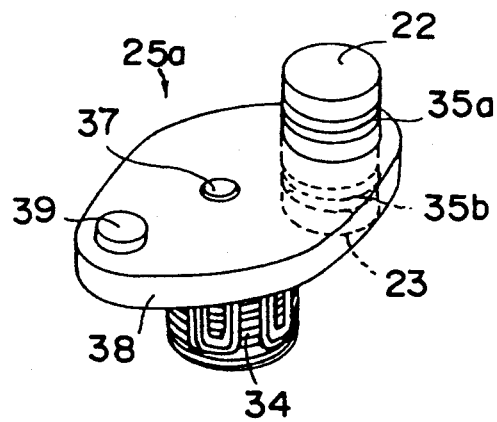
FIG. 6 is a perspective view of another pickup.
Figure 7:
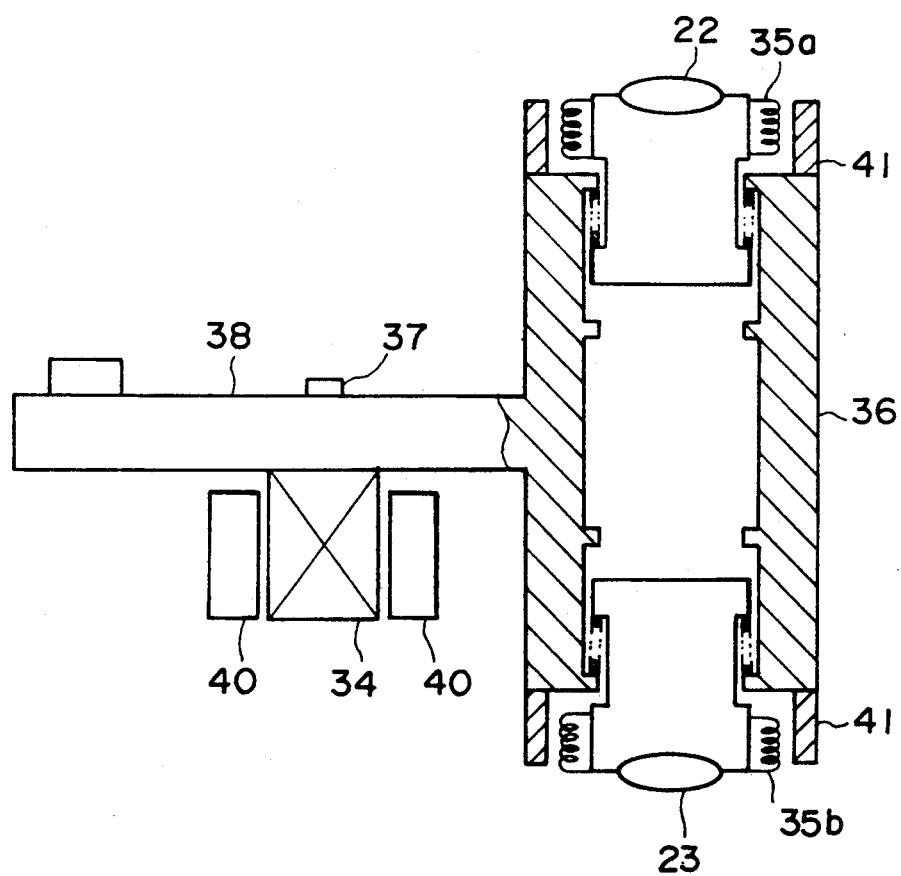
FIG. 7 is a sectional view of the pickup of FIG. 6.

FIGS. 6 and 7 show a pickup 25a as another example. The pickup 25a comprises a rotating plate 38 securely mounted on a rotating shaft 37. The rotating shaft 37 is securely mounted on a rotor provided in a magnetic tracking coil 34 disposed adjacent magnets 40. The objectives 22 and 23 having focus coils 35a and 35b, respectively, are mounted on both ends of a cylinder 36 secured to the rotating plate 38 at' an end thereof. Around each objective 22 (23), a cylindrical magnet 41 is provided. A balancer 39 is provided on the plate 38 opposite to the cylinder 36. The objectives 22 or 23 is independently moved in the focus direction by the excitation of the focus coil 35a or 35b. When the tracking coil 34 is energized, the rotating plate 38 is rotated to rotate the objectives in the tracking direction.

In accordance with the present invention, the objectives 22, 23 are independently moved in the focusing direction and moved in the radial direction together. Thus, recording operation on the unrecorded disk is simply and accurately performed based on the control data recorded in the original disk.

Since the tracking of the unrecorded disk is operated together with that of the original disk, a servo system in the radial direction can be omitted.

As a result, if an original disk having the control data is provided, it is possible to use a blank disk without guide grooves and pits as an erasable disk, thereby reducing the manufacturing cost of the disk.

Further, a spindle servo is operated based on the synchronizing signal in the original disk so that it is not necessary to provide a spindle motor having high accuracy, thereby reducing the cost of the recording device.

Figure 8:
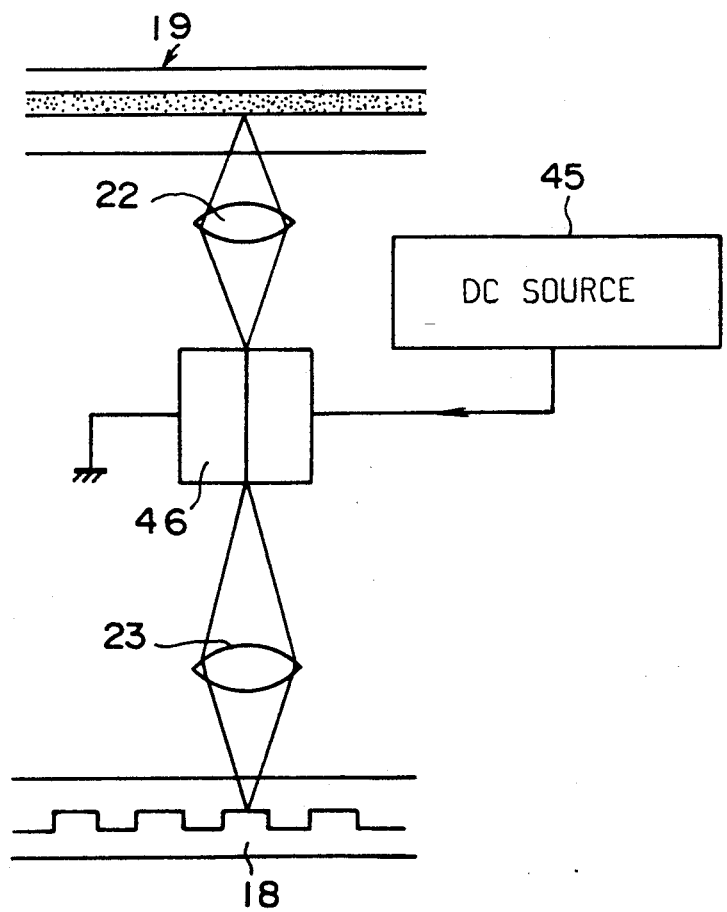
FIG. 8 is a schematic diagram showing another embodiment of the invention.
Figure 9:
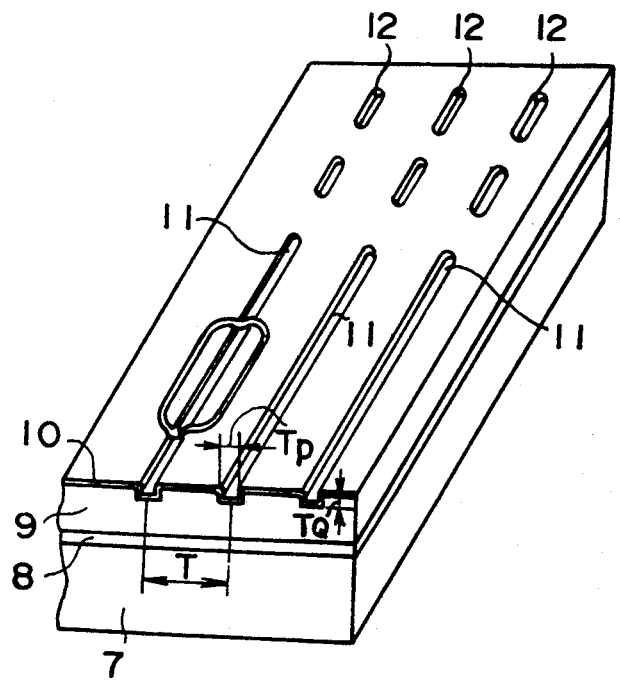
FIG. 9 is a perspective view showing an erasable disk.

Referring to FIG. 8 showing another embodiment of the present invention, in which a photo amplifier 46 is provided between the objectives 22 and 23 for recording the data of the original disk 18 on the unrecorded disk 19. A DC source 45 produces a driving current for driving the photo amplifier 46.

In the embodiment, since the reproduced laser beam is recorded on the disk without passing through an electric circuit system, the influence of noise caused by variation of driving current is prevented. Further, the recording device can be simplified in construction.

In the present invention, if grooves of the original disk is formed in reverse spiral, the original disk and the unrecorded disk are rotated in the same direction.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A recording device for an optical disk, comprising:
   a spindle motor;
   an original disk having tracking control data and spindle motor control data on a recording surface thereof and provided to be rotated by the spindle motor;
   a blank disk having an unrecorded surface which is coaxially disposed with the original disk opposite the recording surface of the original disk, and provided to be rotated by the spindle motor at a same speed as the original disk;
   a reproducing pickup for reading tracking control data and spindle motor control data on the original disk;
   a recording pickup for recording data on the blank disk in accordance with read out control data;
   tracking drive means for driving the reproducing pickup in a radial direction of the disks together with the recording pickup in accordance with read out tracking control data;
   first focusing drive means for focusing the reproducing pickup; and
   second focusing drive means for focusing the recording pickup independent of the reproducing pickup.

2. The recording device according to claim 1, wherein the blank disk and the original occurrence are rotated in opposite directions to each other.

3. The recording device according to claim 1, wherein the reproducing pickup and the recording pickup are coaxially disposed with each other.

* * * * *